(12) United States Patent
Yano et al.

(10) Patent No.: US 6,374,938 B2
(45) Date of Patent: Apr. 23, 2002

(54) SEAT BELT CONTROL DEVICE

(75) Inventors: Ryuji Yano; Hiroaki Fujii; Koji Tanaka; Hideaki Yano; Hiromasa Tanji; Hitoshi Fujita, all of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/734,047

(22) Filed: Dec. 12, 2000

(30) Foreign Application Priority Data

Dec. 13, 1999 (JP) ............................................. 11-352972

(51) Int. Cl.$^7$ ................................................ B60R 21/00
(52) U.S. Cl. ........................................ 180/268; 280/807
(58) Field of Search ................................. 180/268, 270, 180/271; 280/801.1, 801.2, 806, 807

(56) References Cited

U.S. PATENT DOCUMENTS 3,898,473 A * 8/1975 Ueda et al. ................. 180/270
4,280,584 A * 7/1981 Makishima ................. 180/268
4,410,061 A * 10/1983 Terabayashi ................. 180/268
4,553,625 A * 11/1985 Tsuge et al. ................. 180/268
4,742,886 A * 5/1988 Sato ............................ 180/268
4,763,750 A * 8/1988 Yoshitsugu ................. 180/268
6,059,066 A * 5/2000 Lary ............................ 180/268

* cited by examiner

*Primary Examiner*—Paul N. Dickson
*Assistant Examiner*—Faye M. Fleming
(74) *Attorney, Agent, or Firm*—Takata Corporation

(57) ABSTRACT

In a seat belt control device of the invention, when a buckle switch detects disengagement of a buckle and a tongue plate of a seat belt, the seat belt is retracted through a motor. In addition, the seat belt is re-retracted, through a motor, when a passenger detector detects that no passenger is present in an automobile, when a door switch detects that a door opens, or when an engine key switch detects that an engine key is pulled out or is in an off state. Thus, the seat belt can be positively retracted. Therefore, when a passenger gets off or is going to get off, the seat belt can be securely retracted to thereby prevent the seat belt from being caught by a projection in a compartment or by the door of the automobile.

6 Claims, 2 Drawing Sheets

SEAT BELT CONTROL DEVICE

BACKGROUND OF THE INVENTION AND RELATED ART STATEMENT

The invention relates to a seat belt control device for controlling retraction of a seat belt through a motor in a seat belt system having the motor for retracting the seat belt.

In a seat belt to be used in a vehicle or automobile, a tension is provided by a seat belt retractor. In other words, in case the seat belt is used, one portion of the seat belt wound by a spring in the seat belt retractor is pulled out by a passenger and engaged with a part of the seat belt fixed to a seat through a buckle. Thereafter, when the passenger leaves the hands from the seat belt, the loosened seat belt is wound up by an action of the spring in the seat belt retractor and a tension determined by the spring is provided to the seat belt to thereby bind or hold the passenger to the seat.

However, in such a spring-type retracting mechanism, when a spring force for retracing the seat belt is made weak, the seat belt is not sufficiently retracted to remain looseness. On the contrary, when the spring force is made strong, the passenger wearing the seat belt receives a pressed or tightened feeling.

To solve the above problems, the present inventors have proposed a seat belt driving device for easily loosening a binding force of a seat belt by pulling thereof, which can cooperate with a retracting control flexibly, as disclosed in Japanese Patent Application No. 11-126242 (hereinafter referred to as "precedent patent application"). In the preceding patent application, a direct current (hereinafter referred to as "DC") motor is used to drive the seat belt, and a pulse width modulation (hereinafter referred to as "PWM") control or a pulse width constant.period variable control is carried out to control a rotating direction and a rotating speed of the DC motor.

However, in the precedent patent application, a retraction of the seat belt through a motor is carried out only when disengagement of a buckle and a tongue plate is detected by a buckle switch disposed in the buckle, and only for a predetermined time.

Therefore, for example, in case a passenger holds the seat belt with hands while the retraction is being carried out, the seat belt remains loose. Thus, there have been problems such that the seat belt is caught by a projection in a compartment or caught by the door.

In view of the above problems, the present invention has been made, and an object of the invention is to provide a seat belt control device, by which a seat belt is positively retracted so that the seat belt is not caught by a projection in a compartment of an automobile nor caught by a door when a passenger gets off or is going to get off.

Further objects and advantages of the invention will be apparent from the following description of the invention.

SUMMARY OF THE INVENTION

According to a first aspect of the invention to attain the above object, a seat belt control device for controlling retraction of a seat belt through a motor includes a passenger detector in an automobile compartment, wherein when the passenger detector detects that no passenger is present in an automobile or when such a condition is held for a predetermined time, the seat belt is retracted.

In the first aspect, when the passenger gets off or when such a condition is held for a predetermined time, the seat belt is retracted. For example, even if the seat belt remains loose when disengagement of a buckle and a tongue plate is made, thereafter, the seat belt can be securely retracted to thereby prevent the seat belt from being caught by a projection in a compartment or a door of the automobile. As the passenger detector, for example, a known detector employing infrared rays used for an automatic door or the like may be employed.

According to a second aspect of the invention to attain the above object, a seat belt control device for controlling retraction of a seat belt through a motor includes a door switch, wherein when the door switch detects that a door is open or when such a condition is held for a predetermined time, the seat belt is retracted.

In the second aspect, when the door is open or such a condition is held for a predetermined time, the seat belt is retracted based on the judgement that the passenger is going out or, at least, the passenger is not wearing the seat belt. Thus, even if the seat belt remains loose without being retracted when the tongue plate is disengaged from the buckle, thereafter, the seat belt can be securely retracted to thereby prevent the seat belt from being caught by a projection in the compartment or the door of the automobile.

According to a third aspect of the invention to attain the above object, a seat belt control device for controlling retraction of a seat belt through a motor includes an engine key switch, wherein when the engine key switch detects that an engine key is pulled out, an engine is turned off, or such a condition is held for a predetermined time, the seat belt is retracted.

In the third aspect, when it is detected that the engine key is pulled out or the engine is turned off, or when such a condition is held for a predetermined time, the seat belt is retracted based on the judgement that the passenger gets off or, at least, the passenger does not wear the seat belt. Thus, even if the seat belt remains loose when the tongue plate is disengaged from the buckle, thereafter, the seat belt can be positively retracted to thereby prevent the seat belt from being caught by a projection in the compartment or by a door of an automobile.

According to a fourth aspect of the invention to attain the above object, in any of the first to third aspects, a retracting time of a seat belt is a predetermined time.

In the fourth aspect, since retraction of the seat belt is terminated after passage of a predetermined time from a start of the retraction, a load is not applied to the motor for a long time and an electric current of a battery is not uselessly consumed. It is preferable to set the predetermined time to a sufficient time required for retracting the seat belt.

DETAILED DESCRIPTION OF PREFERRED EMBODIMENTS

Figure 1:
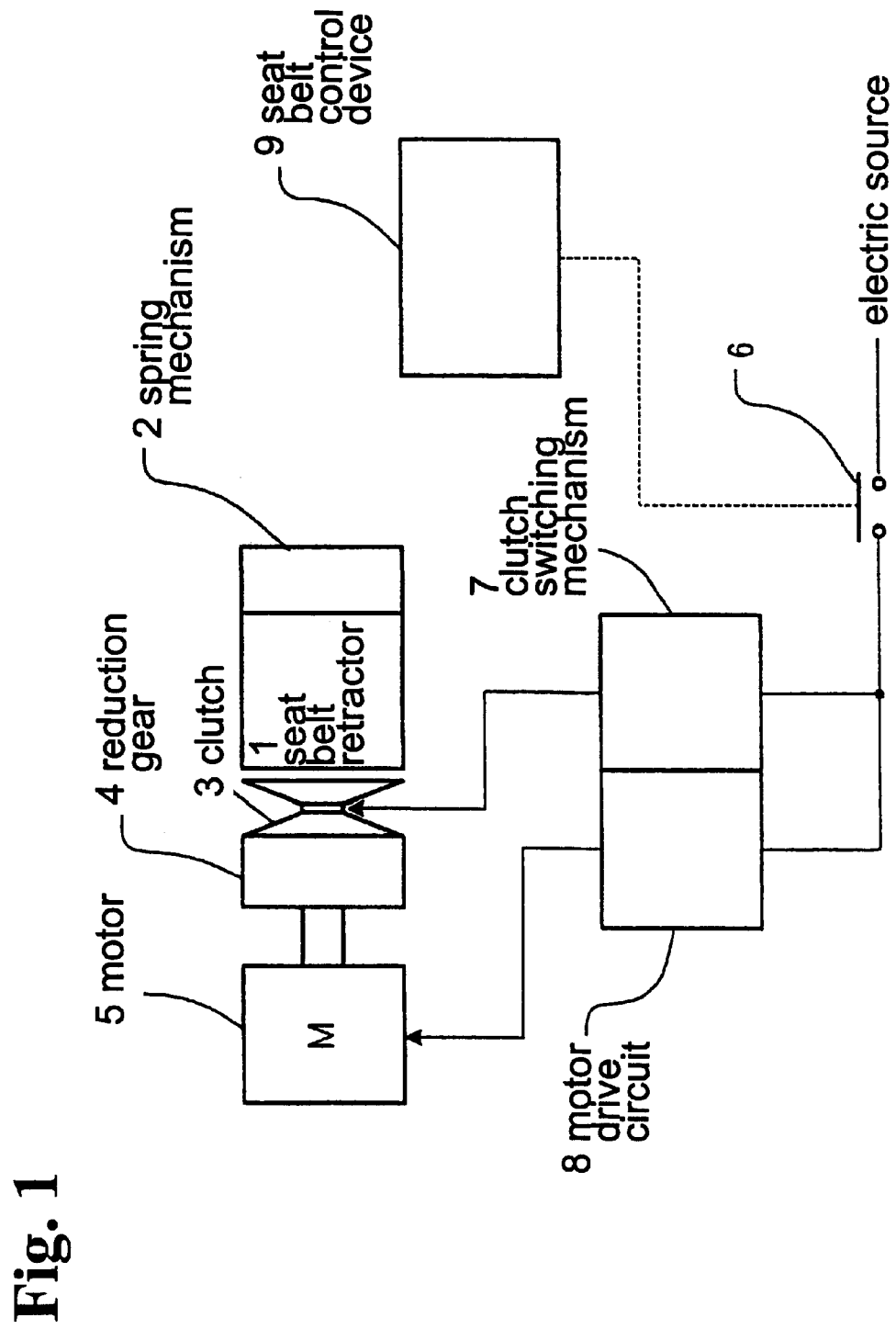
FIG. 1 is a schematic block diagram showing a mechanism for controlling a seat belt retractor.

Hereunder, embodiments of a seat belt control device according to the present invention are explained with reference to the accompanying drawings. Incidentally, in the drawings, sizes, shapes and positional relationships of the respective constituent parts are schematically shown to a degree by which the invention can be understood. FIG. 1 is a schematic view of a mechanism for controlling a seat belt retractor. In FIG. 1, reference numeral 1 represents a seat belt retractor, 2 is a spring mechanism, 3 is a clutch, 4 is a reduction gear, 5 is a motor, 6 is a contact point, 7 is a clutch switching mechanism, 8 is a motor drive circuit and 9 is a seat belt control device.

The seat belt retractor 1 is connected to the spring mechanism 2 as well as the reduction gear 4 through the clutch 3. The reduction gear 4 is directly connected to the motor 5. Under a normal condition, when the control circuit 9 opens the contact point 6, the clutch switching mechanism 7 turns the clutch 3 "off". Thus, the seat belt retractor 1 operates to retract the seat belt by the spring force of the spring mechanism. A retraction of the seat belt, at this time, is carried out with a force binding a passenger to a seat without providing any pressing feeling to the passenger.

When the contact point 6 is closed by a command of the control circuit 9, the clutch switching mechanism 7 turns the clutch 3 "on". At the same time, the motor drive circuit 8 drives the motor 5. Thus, the seat belt retractor 1 is driven by the motor 5 in a state connected to the reduction gear 4 to thereby retract the seat belt. The retraction of the seat belt, at this time, is carried out with a force larger than a retracting force of the spring mechanism 2, so that the seat belt can be securely retracted.

Figure 2:
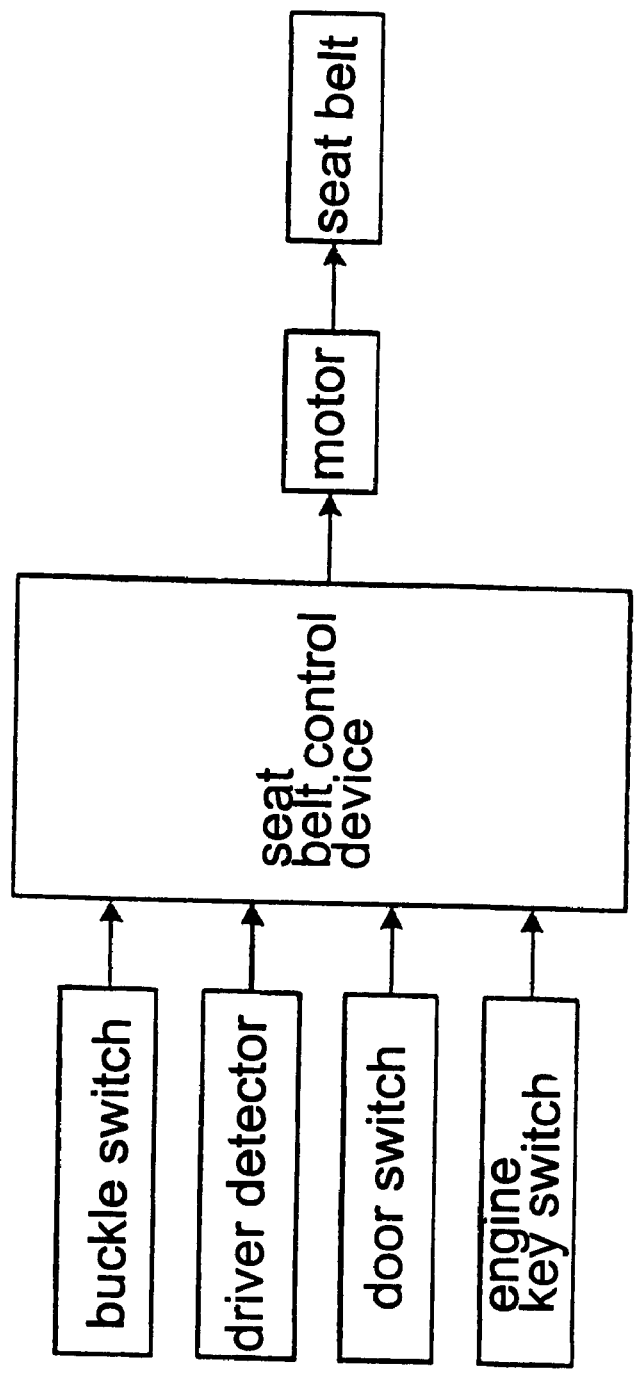
FIG. 2 is a schematic block diagram showing an embodiment of a seat belt control device according to the present invention.

FIG. 2 shows an embodiment of the seat belt control device according to the present invention. Conditions of a buckle switch, driver detector (passenger detector in a compartment), door switch, engine key switch are inputted into the seat belt control device. Among the passenger detector, door switch and engine key switch, at least one of the switches may be inputted.

The seat belt control device controls retraction of the seat belt through the motor. Specifically, the control is carried out by opening and closing the contact point 6 as shown in FIG. 1.

First, when the buckle switch detects disengagement of a buckle and a tongue plate, the seat belt control device turns the contact point 6 on for a predetermined time to retract the seat belt through the motor 5.

In the present embodiment, in addition to the above, the seat belt control device turns on the contact point 6 for a predetermined time to re-retract the seat belt through the motor 5 at any time when the passenger detector detects no passenger in the automobile, when the door switch detects opening of the door, or when the engine key switch detects that the engine key is pulled out or that an engine is off. Thus, when the retraction is carried out due to disengagement of the buckle and the tongue plate, in case the retraction of the seat belt is not carried out since the passenger is holding the seat belt by hands, or if retracted, in case the seat belt is not sufficiently retracted, the seat belt can be securely retracted through the re-retraction.

In case the passenger detector detects that no passenger is present in the automobile; in case the door switch detects that the door is open; or in case the engine key switch detects that the engine key is pulled out or in an off state, the seat belt may be retracted after being held in the state for a predetermined time without immediately being retracted.

As explained above, according to the present invention, even if the seat belt is not retracted at the time of retraction due to the disengagement of the buckle and the tongue plate, the seat belt can be re-retracted when the passenger gets off or is going to get off to thereby prevent the seat belt from being caught by a projection in a compartment or being caught by the door of the automobile.

While the invention has been explained with reference to the specific embodiments of the invention, the explanation is illustrative and the invention is limited only by the appended claims.

What is claimed is:

1. A seat belt control device for controlling retraction of a seat belt, comprising:

a motor connected to a seat belt retractor to which the seat belt is attached, to retract the seat belt, at least one mechanism selected from a group consisting of a passenger detector situated in a compartment of an automobile for detecting a passenger, a door switch for detecting a condition of a door, and an engine key switch for detecting if an engine key is pulled out or the engine key is in an off condition, and a control section connected to the motor, passenger detector, the door switch and the engine key switch for retracting the seat belt, said control section actuating the motor for retracting the seat belt when the passenger detector detects that no passenger is present in the compartment or when a non-passenger condition is held for a predetermined time; when the door switch detects that the door is open or when a door open condition is held for a predetermined time; and when the engine key switch detects that the engine key is pulled out, the engine key is in an off state, or an off state condition of the engine key is held for a predetermined time.

2. A seat belt control device according to claim 1, wherein when said control section receives a retraction signal from one of the passenger detector, door switch and engine key switch, the motor is actuated for a predetermined time to retract the seat belt.

3. A seat belt control device according to claim 2, further comprising a buckle switch connected to the control section for detecting whether the seat belt is fastened, said control section retracting the seat belt when the buckle switch detects that the seat belt is unfastened.

4. A seat belt control device according to claim 2, wherein said control section includes a contact electrically communicating with the motor of the seat belt retractor so that when one of the passenger detector, door switch and engine key switch is actuated to control the motor, said contact is closed for said predetermined time to actuate the motor.

5. A seat belt control device according to claim 4, further comprising a clutch situated between the motor and the seat belt retractor to connect the motor and the seat belt retractor, said control section further including a clutch switching mechanism situated between the clutch and the contact so that when the contact is closed, the clutch between the motor and the seat belt retractor is connected and the motor is actuated to retract the seat belt.

6. A seat belt control device according to claim 5, further comprising a spring mechanism connected to the seat belt retractor for retracting the seat belt when the motor is not connected to the retractor through the clutch.

* * * * *